Figure 1:
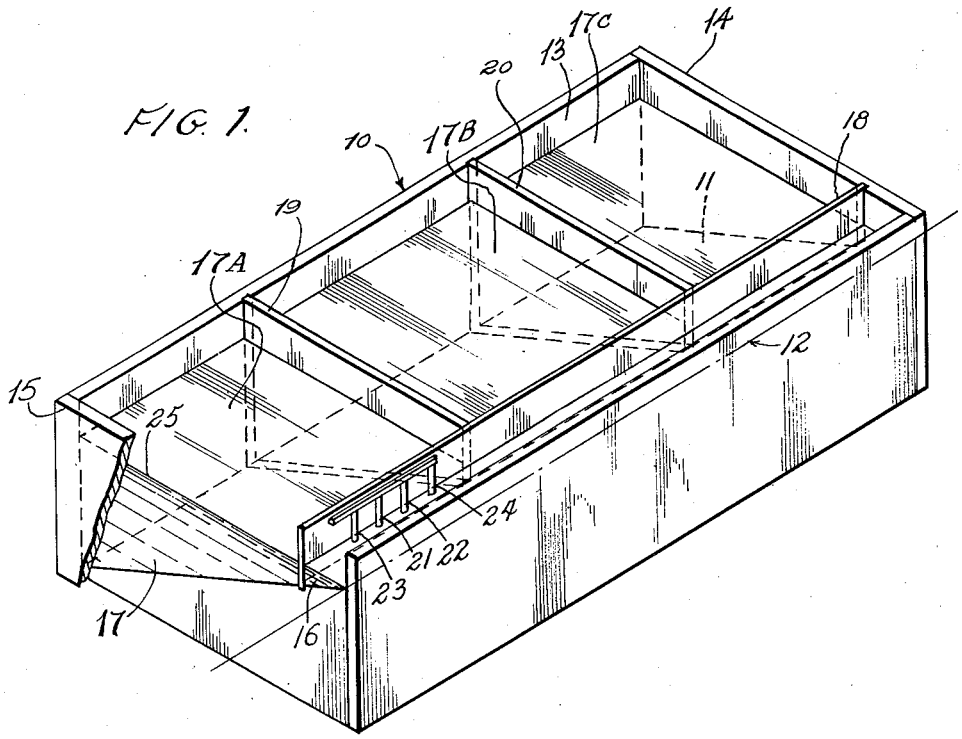

June 11, 1957  R. J. LOOFBOURROW ET AL  2,795,377

ELECTRICAL ANALOGUES

Filed Nov. 26, 1952

INVENTORS
ROBERT J. LOOFBOURROW
ROLAND B. STELZER
BY CLARENCE B. SCOTTY

ATTORNEY

United States Patent Office 2,795,377
Patented June 11, 1957

2,795,377

ELECTRICAL ANALOGUES

Robert J. Loofbourrow, Roland B. Stelzer, and Clarence B. Scotty, Bellaire, Tex., assignors to The Texas Company, New York, N. Y., a corporation of Delaware Application November 26, 1952, Serial No. 322,686

7 Claims. (Cl. 235—61)

This invention relates to conductive barriers and particularly to barriers for use in potentiometric models employed for the solution of problems encountered in the investigation of magnetic, mechanical, hydraulic, and thermal systems.

U. S. Patent 2,547,950 for Electrical Analogues discloses apparatus by means of which problems relating to the abovementioned fields may be solved. As disclosed in this patent, a model is usually made up in which a pool of electrolyte corresponds in shape to a section of the object to be studied and electrical potentials corresponding in magnitude and location to field forces acting upon the object to be studied are imposed across the pool. The pool of electrolyte is divided into sections corresponding to those of the object under study by means of barriers extending across the pool. The pool is then explored with one or more electrodes at a plurality of points so as to determine the potentials at these points.

This potentiometric analogy has been employed to study the characteristics of oil and gas fields, as for example, by representing a field by electrodes projecting into the pool of electrolyte. In a potentiometric model of a well bore, an elongated trough or basin represents the area containing the well bore. A longitudinal barrier divides the trough into two adjacent compartments, one narrow, representing the well bore, and the other wide, representing the earth formations surrounding the well bore. Pools of electrolyte are disposed in the two compartments. Means are provided for transmitting electrical current across the barrier at a plurality of points throughout its length, but not longitudinally thereof so that no equipotential surface is necessarily established at the barrier.

In order to simulate a series of earth formations penetrated by the well bore, the wide compartment may be subdivided by barriers or partitions disposed transverse to the longitudinal barrier. Each of the compartments or sections defined by the partitions contains a pool of electrolyte, the resistivity of which is adjusted to represent the resistivity of the body it represents, for example, the mud of the well bore, or of one of the formations penetrated by the bore.

The present invention contemplates the use of a barrier composed, at least in part, of a metal which is capable of reversible electrochemical equilibrium with an electrolyte. For example, the electrolyte in which the barrier is immersed in an aqueous solution which contains ions of the same metal as the barrier. A suitable combination is a barrier composed in part of lead metal and electrolyte which contains in solution lead acetate and acetic acid. When immersed in such an electrolyte the barrier surface is slowly and continuously cleansed and purged of any resistive film having a tendency to form thereon, so that there is substantially no change of resistivity of the electrolyte during the time an electrical potential is impressed across the combination of barrier and electrolyte. Furthermore, a uniform potential gradient is obtained throughout the pool of electrolyte during the time a study is made.

The barriers used in such studies may comprise an impervious wall formed of nonconductive material and having electrolyte coupling means comprising a plurality of pairs of conductive electrolyte contact surfaces with the two contact surfaces located in registering positions on the opposite sides or surfaces of the walls of the barrier with a low impedance electrical connection between each pair of contact surfaces. For example, an advantageous form for a barrier consists of loops of conductive metal strips crossing the top of the barrier, each strip being narrowly spaced from adjacent strips and projecting into pools of electrolyte on each side of the barrier. Another barrier form is obtained by coating a sheet of an insulating plastic with a thin layer of conductive material. Fine lines or grooves are milled in the coating after it is dry, up and down on both faces of the barrier and across the top edge, so as to leave a plurality of spaced strips of conductive material running crosswise of the major surfaces and over the top edge.

When an unsuitable barrier is placed between two sections of the electrolyte in a potentiometric model and a potential distribution of the model is plotted, a line is noticeably displaced at the barrier since there is a potential drop across the barrier itself. The ideal case occurs when the metallic barrier appears as a window for the potential or appears to be invisible to the potential drop, then there is no potential drop across the barriers regardless of the current density. However, a problem encountered heretofore in using barriers in potentiometric models has been the existence of a surface resistance at the liquid-metal interface.

A thin electrolytic type of film is built up on the surface of the metal and appears as a resistance to an electric current. This film is called a passive film. The resistance of the film is essentially a constant for a given current density and its effect is more apparent in a solution of low resistivity than in a high resistivity solution or electrolyte.

If an alternating current is used the effect of the film can be overcome by using a current of high frequency. The frequency necessary to overcome the effect of the film is dependent on several factors, such as the kind of metal, the condition of the metal surface, the kind and quantity of electrolyte present in the solution, etc., and for some metals, a current having a frequency as high as 10,000 cycles per second is required to overcome the film. However, in the operation of potentiometric models a much lower frequency, such as 60 cycles per second, is preferred in order to simplify the instrumentation required, but a current of such low frequency will not overcome the passive film. Once such a passive film has formed, the model no longer represents the object under study since the current flow and potential gradients caused thereby are distorted.

By means of the present invention the disadvantages described hereinabove are overcome by providing barriers for use in potentiometric models with metals capable of going into solution in electrochemically compatible electrolytes without forming passive films or oxide barriers. The term "electrochemically compatible" as used herein is understood to mean that the metal forming the barrier can maintain a reversible electrochemical equilibrium with the electrolyte, that is, the metal does not enter into the solution at a rate so high that the barrier is completely consumed within an unreasonably short period of time, or so rapid that the resistivity of the electrolyte changes during the study, and the metal of the barrier which goes into solution in the electrolyte cooperates with the ions of the electrolyte to give the desired conductivity. Furthermore, the term "electrochemically compatible" as used herein includes the phenomenon whereby the electrolyte will react with an oxide of a metal used in the barrier to form a compound of the metal which is soluble in the electrolyte, and thus keep the surface of the barrier free from oxide deposits or films.

For example, traces of nitric acid, which has a very large ionization constant, could be used satisfactorily in an electrolyte solution. On the other hand, carbonic acid or hydrogen sulfide dissolved in water are very weakly ionized acids, but they are unsuitable in an electrolyte solution used with barriers which contain lead because their anions are incompatible with the lead ion in solution. As a practical matter, the use of an acid with a low ionization constant, for example less than $1 \times 10^{-3}$, such as acetic acid, offers the advantage of eliminating the necessity of having to continuously adjust the solution to keep the pH down as the metal barrier is slowly dissolved. If a strongly ionized mineral acid, such as nitric acid, is used means must be provided for the addition of the acid as the metal barrier is slowly dissolved. The use of an aqueous solution of acetic acid and lead acetate with a barrier containing lead metal is quite advantageous in that this combination acts as a buffer and holds the pH constant when the lead is very slowly dissolved from the barrier during the time a potentiometric model study is made, and prevents the deposition of lead oxide on the barrier.

It may be advantageous in some instances to add a small amount of a compatible ionizable salt, such as an alkali metal nitrate, to the electrolyte solution in order to increase the conductivity of the solution. For example, the amount of highly ionizable salt so added may be in the range from a fraction to saturation of the electrolyte solution.

The resistivity of electrolyte solutions used in potentiometric models, determined as ohm-centimeters, may vary from a value somewhat greater than zero to infinity, the latter value being obtained when any one of the compartments ordinarily filled with electrolyte is left empty and thus represents an infinite resistance. However, for practical experimentation, the desirable range of the resistivity of the electrolyte solution is from 7 ohm-centimeters to 1500 ohm-centimeters.

A 1500 ohm-centimeter lead acetate solution is obtained as follows: 34.5 grams of lead acetate and 10 cc. of glacial acetic acid are added to 3000 cc. of distilled water and then 100 cc. of this resulting stock solution is mixed with 400 cc. of distilled water to give the desired 1500 ohm-centimeter resistivity. A 14 ohm-centimeter solution is made by adding 100 cc. of lead acetate stock solution to 400 cc. of sodium nitrate stock solution. The sodium nitrate stock solution consists of 300 g. of sodium nitrate per 3000 cc. of distilled water. Stated otherwise, the 1500 ohm-centimeter solution contains 0.2% lead acetate by weight and 0.07% glacial acetic acid by volume, and the 14 ohm-centimeter solution contains 8% sodium nitrate by weight, 0.2% lead acetate by weight, and 0.07% glacial acetic acid by volume of the electrolyte solution.

A study was made of these conditions wherein a rectangular glass jar was filled to a given level with a solution of potassium chloride and large current electrode plates were placed at the ends of the jar. Provision was made for inserting a large metal plate as a barrier for separating the fluid electrolyte into two separate pools or bodies. Thus, the resistance drop across a portion of the fluid could be measured without the metal barrier then the additional drop caused by the metal barrier could be measured when the barrier was inserted. The resistance effects of the current and end plate electrodes were eliminated by placing the potential pickup electrodes in the solution.

Potassium chloride having a resistivity of 55 ohm-centimeters was placed in the jar and stainless steel plates were placed in the jar as the barriers. The stainless steel plates increased the resistance over the fixed path between the potential probe 150 to 200 percent over the value obtained with the potassium chloride electrolyte alone.

Further investigation was made of a number of metals in potassium chloride electrolyte. Copper with and without silver plating, Monel metal, gold-plated stainless steel, tantalum, sterling silver, nickel, magnesium, lead, zinc, and aluminum were found to exhibit a surface resistance similar to that of the stainless steel, referred to in the preceding example.

In order to make the surface of these metals active or conductive the passive layer must be removed. Cleansing by wiping the surface with a wire brush, or chemically etching of some of the metal surface will restore its activity, but in a short time the surface again becomes passive due to electrolytic action.

When lead was used as a barrier in a saturated solution of lead acetate to which sufficient acetic acid was added to clear the solution, the lead barrier exhibited zero initial resistance and the surface of the lead continued to remain shiny and clean. After four days of use, the resistance of the lead barrier was still zero and the resistivity of the electrolyte was about 125 ohm-centimeters. A small amount of sodium nitrate added to the lead acetate solution reduced the resistivity down to about 7.5 ohm-centimeters. Other nitrate salts, such as potassium nitrate, in which lead acetate is soluble, also lowered the resistivity. There was no potential drop across the barrier at any current density below the level at which bubbles were formed at the metal interface, and for reasonable barrier areas this bubble point occurs at a current density level many times greater than the operating current density level.

A further advantage obtained with the use of lead barriers in a lead acetate-acetic acid electrolyte arises from the fact that this combination shows no variation of surface resistance with current density.

It is advantageous to clean the lead, prior to use in a model, with acetone or scouring powder in order that its surface is degreased and water-wettable. The lead then does not change resistance with time as long as it is in the electrolyte solution and changes only slightly in air, recovering quickly when placed in the electrolyte solution.

The description hereinabove of the use of a barrier, in which lead comprises the conductive material, immersed in a lead acetate-acetic acid electrolyte is one example of present invention.

Figure 2:
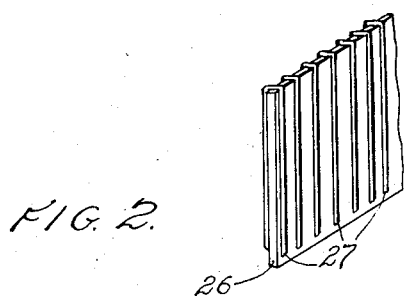

In order to clarify the application of the invention, attention is directed to the accompanying drawing in which Figure 1 represents a potentiometric model used in the investigation of electrical logging as employed in oil fields, and Figure 2 is a perspective view of a type of barrier which may be used in the model illustrated in Figure 1. In electrical logging, currents are set up in the mud or liquid in the well bore and thus in the formation and the effects of these currents are measured with exploring electrodes drawn through the well bore. By using a potentiometric model of a well and its surrounding formations, such as that represented by the figure, studies can be made of the theoretical and practical aspects of electrical logging.

To facilitate the use of liquids in the model, its axis (the well axis) is disposed horizontally instead of vertically, with the bottom sloping downward away from the axis. The liquid in the tank 10 thus assumes a wedge-shape, a bottom 11 defining one side and the liquid level 25 the other. The tank 10 has the flat bottom 11 which slopes downward away from the "well axis" 12, a vertical side wall 13 which is fastened to the bottom and wedge-shaped walls 14, 15 which help to retain pools of electrolyte 16, 17. A vertical barrier 18 parallel to the side wall 13 separates a part of the slice near the well axis 12 from the rest of the slice. Thus the pool 16 near the axis represents the well, while the larger and deeper pool 17 represents the formations penetrated by the well. In the case illustrated there are three such formations, 17A, 17B, 17C. These are separated from each other by vertical wedge-shaped partitions 19, 20, which are parallel to the end walls 14, 15. The liquid levels of the inner pool 16 representing the well bore, and the outer pools 17A, 17B, 17C representing the formations are the same and pass through the well axis 12. A potential may be applied to the pool of electrolyte 16 through electrodes 21, 22, and exploring electrodes 23, 24, may be used to detect voltage variations in the pool 16 as the electrodes are moved in fixed spaced relationship along the pool 16.

Figure 2 is a more detailed perspective view of a type of conductive barrier which may be used for barrier 18 and partitions 19 and 20 of Figure 1. This barrier may include an impervious insulation member 26 over which may be hung or in which may be imbedded a series of spaced U-shaped conductors 27 composed of lead in accordance with the teachings of the invention.

The side wall 13 and the barrier 18 (which represents the wall of the well) may be curved about the well axis, if desired. The conductive strips of the barrier 18 may be formed of lead, for example, in which case the electrolyte advantageously comprises a saturated solution of lead acetate in acetic acid as previously described.

Obviously many modifications and variations of the invention as hereinbefore set forth may be made without departing from the spirit and scope thereof.

We claim:

1. In an electrical analogue apparatus the combination of a container provided with a barrier which divides said container into two compartments, said barrier being composed in part of a plurality of electrically insulated lead contacts, at least a portion of each of said contacts being disposed in registering positions on opposite sides of said barrier, each of said compartments containing an electrolyte consisting essentially of an aqueous solution of lead acetate, acetic acid, and sodium nitrate.

2. The combination according to claim 1 wherein the concentration of said electrolyte is 0.2% lead acetate by weight, 8% sodium nitrate by weight, and 0.07% glacial acetic acid by volume.

3. An electrical analogue apparatus comprising a container, a barrier disposed within said container dividing said container into two compartments, said barrier being composed of an impervious electrical insulation material and means composed of lead for transmitting electric currents transversely of said barrier but incapable of transmitting currents lengthwise of said barrier, and an electrolyte disposed within each of said compartments and consisting essentially of an aqueous solution of lead acetate, acetic acid and sodium nitrate 4. A potentiometric model of a well comprising a container provided with an impervious barrier which divides said container into two compartments, each of said compartments containing an electrolyte and means for applying a potential to said electrolyte, said barrier having a plurality of separately spaced electrically conductive lead contacts disposed in registering positions on opposite sides of said barrier to transmit electrical current across said barrier from one compartment to the other, said electrolyte consisting essentially of an aqueous solution of lead acetate and acetic acid.

5. An electrical analogue apparatus comprising a container, a barrier disposed within said container dividing said container into two compartments, said barrier being composed of an impervious electrical insulation material and means composed of lead for transmitting electrical currents transversely of said barrier but incapable of transmitting currents lengthwise of said barrier and an electrolyte disposed within each of said compartments and consisting essentially of an aqueous solution of lead acetate and acetic acid.

6. Apparatus as set forth in claim 5 wherein said electrolyte consists essentially of an aqueous solution of 0.2% lead acetate by weight and 0.07% glacial acetic acid by volume.

7. A potentiometric model comprising a container provided with an impervious barrier which divides said container into two compartments, each of said compartments containing an electrolyte, and means for applying a potential to said electrolyte, said barrier having a plurality of separately spaced electrical conductors having contacts disposed in registering positions on opposite sides of said barrier to transmit electrical current across said barrier from one compartment to the other, each of said conductors being composed of lead, said electrolyte consisting essentially of an aqueous solution of a weak acid having an ionization constant less than $1 \times 10^{-3}$ and a water-soluble lead salt of said acid effective to slowly dissolve lead and prevent the deposition of lead oxide on the barrier.

References Cited in the file of this patent

UNITED STATES PATENTS 2,547,950   Lee et al. _____ Apr. 10, 1951

OTHER REFERENCES

"Treatise on Inorganic and Theoretical Chemistry," by Mellor, vol. 7 (1927), page 539.